United States Patent [19]

Deverell et al.

[11] Patent Number: 4,525,620

[45] Date of Patent: Jun. 25, 1985

[54] METHOD OF WELDING FERRITIC AND AUSTENITIC STAINLESS STEELS AND PRODUCT THEREOF

[75] Inventors: Harry E. Deverell, Natrona Heights; Jack M. Beigay, Freeport, both of Pa.

[73] Assignee: Allegheny Ludlum Steel Corporation, Pittsburgh, Pa.

[21] Appl. No.: 418,315

[22] Filed: Sep. 15, 1982

[51] Int. Cl.$^3$ ................................................ B23K 9/23
[52] U.S. Cl. ............................ 219/137 WM; 219/60.2
[58] Field of Search .......... 219/137 WM, 137 R, 60.2

[56] References Cited

U.S. PATENT DOCUMENTS 2,862,102 11/1958 Heuschkel .................. 219/137 WM

FOREIGN PATENT DOCUMENTS 42148 3/1980 Japan ........................... 219/137 WM
100891 8/1980 Japan ........................... 219/137 WM

OTHER PUBLICATIONS

Lowrie, R., "Welding E-Brite 26-1 to Other Alloys", *Welding Journal*, Nov. 1973.

*Primary Examiner*—Roy N. Envall, Jr.
*Assistant Examiner*—Alfred S. Keve
*Attorney, Agent, or Firm*—Patrick J. Viccaro

[57] ABSTRACT

A method of welding ferritic stainless steel to austenitic stainless steel to form a corrosion-resistant welded article having a stabilized weld joint is provided. The ferritic steel contains 17 to 35% chromium and a total carbon and nitrogen less than the total carbon and nitrogen of the austenitic steel containing 16 to 29% chromium. The weld is stabilized with up to 4% stabilizer selected from the group consisting of titanium and columbium, and at least 0.5% stabilizer when the weld deposit contains at least about 22% chromium or at least 30% total of chromium and three times the molybdenum content, and at least 0.8% stabilizer for less than about 22% chromium or less than about 30% total of chromium and three times the molybdenum content. The source of the stabilizer may be the ferritic steel or austenitic steel or a weld filler metal.

A corrosion-resistant welded article produced by the method is also provided, such as a ferritic stainless steel tube and austenitic stainless steel tubesheet.

18 Claims, No Drawings

METHOD OF WELDING FERRITIC AND AUSTENITIC STAINLESS STEELS AND PRODUCT THEREOF

BACKGROUND OF THE INVENTION

This invention relates to a method of welding ferritic and austenitic stainless steels. More particularly, it relates to a method of welding such steels with a stabilized filler metal to provide a corrosion-resistant article.

Although conventional ferritic stainless steels could provide adequate corrosion resistance in some environments, the steels are not extensively used in an as-welded condition because of difficulties in forming and joining. In joining conventional ferritic stainless steels, the as-welded condition often exhibits a tendency to form hard brittle martensite and to show poor corrosion resistance. Such steels are subject to sensitization as a result of the reaction of carbon, nitrogen and chromium in the formation of carbides and nitrides. There are two conventionally-known methods to avoid or reduce sensitization in the as-welded condition. The alloy may be stabilized, such as by the addition of titanium, columbium, zirconium or mixtures of these alone or in combination with aluminum in carefully controlled amounts. Sensitization can also be reduced by lowering the carbon and nitrogen levels of the alloy such as E-Brite alloys (trademark of Allegheny Ludlum Steel Corporation) and alloys containing nominally 29% chromium and 4% molybdenum which may or may not include 2% nickel. However, some alloys containing low carbon and nitrogen such as the E-Brite alloys (nominally 26% chromium) may still need the addition of columbium as a stabilizer, for example, since the solubility of carbon and nitrogen in the ferritic steel is very low. Higher alloy steels like the 29% chromium and 4% molybdenum alloys seem to tolerate generally higher levels of carbon and nitrogen and do not require stabilizers.

As a result of such techniques, newer ferritic alloys have been developed which have a corrosion resistance comparable to austenitic stainless steels and some nickel base alloys such as Alloys G, 825 or 625. Such new ferritic stainless steels may have low interstitials (relatively low carbon and nitrogen levels) or be stabilized, or both.

Though the ferritic stainless steels are readily weldable and have good mechanical and corrosion properties, it is frequently necessary to join dissimilar alloys, such as by welding. As a result, in some corrosive media particular intergranular corrosion attack occurs, which is not present if welding occurs between low interstitial alloys which are matched or stabilized ferritic alloys which are matched. Examples of welds between a ferritic stainless steel and an austenitic stainless steel which are in service in a corrosive environment occur particularly in applications of a ferritic steel tube disposed in an austenitic steel tubesheet. Such an arrangement may occur because of the corrosion service required of the tubes and the ready availability of the austenitic steel tubesheet. Such arrangments are also occasioned when retrofitting existing austenitic steel tubesheets with ferritic steel tubes to satisfy corrosion service requirements. The seal weld to join the ferritic stainless steel tube to an austenitic stainless steel tubesheet may or may not require the use of a similar material in the form of a filler material. In any event, however, the corrosion resistance of the combinations vary depending upon the two alloys, any filler metal and the corrosive environment. The use of a ferritic steel with low solubility for carbon and nitrogen in comparison to austenitic stainless steels makes the production of a weld joint resistant to intergranular corrosion more complex than an all austenitic stainless steel combination. In a ferritic-austenitic combination or composite article, the ferritic steel is the primary cause for any reduction or detrimental effect to the intergranular corrosion resistance of the composite weld.

It is known that a stabilized filler metal, such as Inconel 82 (trademark of Huntington Alloys, Inc.) alloy, nominally containing approximately 20% chromium, 80% nickel and 3% titanium and columbium combined, may be used to sequester the carbon. An article entitled "Welding E-Brite 26-1 to Other Alloys" by R. Lowrie, *Welding Journal,* November 1973, discloses using that stabilized filler for welding E-Brite 26-1 alloy to Type 316 austenitic alloy. There it is explained that the weld of E-Brite alloy to other materials, being a combination between the filler metal and the two base metals, one of which is generally austenitic, is unlikely to be as corrosion resistant as the fully ferritic or nearly fully austenitic base metals because of the very low solubilities for carbon or nitrogen in the ferritic stainless steels, the generally higher carbon and nitrogen levels in the austenitic steels and the precipitation of chromium carbides at grain boundaries below 1200° F., such as may occur during cooling from weld heat. This was cited to result in chromium depletion and some loss of corrosion resistance. The article further reports that the welds of E-Brite 26-1 alloy to Type 316 made using Inconel 82 filler pass the Strauss intergranular corrosion test and a general corrosion resistance test in acetic acid. The best resistance in a weld for stress corrosion, however, was obtained with a nonstabilized filler metal of Type 308L alloy, presumably because of a large volume fraction of ferrite in the weld. This combination is not mentioned as passing the Strauss test.

Current study suggests that a weld between E-Brite 26-1 alloy and Type 316 or 316L made using 308L filler would be susceptible to attack in standard intergranular corrosion resistance tests. The Lowrie article notes that the combinations which passed the Strauss test had not produced a carbide network in either the weld or E-Brite 26-1 alloy heat-affected zone. However, Table 6 of the paper (microstructures of welds) shows other combinations including the 308L filler which passed the stress corrosion test but which also show precipitated carbides which presumably the Strauss test would measure with a fail rating. The article generally recommended that dissimilar metal joints should not be designed for corrosive environments which could cause intergranular attack or chloride stress corrosion cracking.

It is also known that when columbium is the principal stabilizer, some titanium is used to avoid weld cracking sensitivity. Titanium, however, may be used as the sole stabilizer.

What is needed is a method for optimizing the corrosion resistance of a weld between a ferritic stainless steel and an austenitic stainless steel having a total carbon and nitrogen content which exceeds that of the ferritic stainless steel. Furthermore, it is desirable to optimize the method for welding low interstitial ferritic stainless steels to an austenitic stainless steel. The welds of such alloys should satisfactorily pass applicable intergranular corrosion tests such as those described in ASTM Procedures A262, A708 or A763. It is also an object of the present invention to provide a welded article having seal welds or strength welds suitable for a ferritic stainless steel tube-austenitic stainless steel tubesheet welded composite article.

SUMMARY OF THE INVENTION

In accordance with the present invention, a method is provided for welding ferritic stainless steel to austenitic stainless steel to provide a corrosion-resistant welded article. The ferritic stainless steel contains about 17 to 35% chromium and a total carbon and nitrogen less than the total carbon and nitrogen of the austenitic steel containing about 16 to 29% chromium. The weld deposit contains a sufficient amount up to about 4.0% of stabilizer selected from the group consisting of titanium and columbium to stabilize the carbon and nitrogen levels of the weld deposit. Preferably, the weld contains at least 0.5% stabilizer when the weld deposit contains at least about 22% chromium or at least 30% total of chromium and three times the molybdenum content, and at least 0.8% stabilizer when the weld deposit contains less than about 22% chromium or less than about 30% total of chromium and three times the molybdenum content. The source of the stabilizer for the weld may be from a stabilized ferritic steel, or a stabilized austenitic steel or weld filler metal or any combinations thereof. The method is suitable for low interstitial ferritic steels having less than 0.025% total carbon and nitrogen.

A corrosion-resistant welded article made by the method of the present invention is also provided. The article may be a ferritic stainless steel tube welded to an austenitic stainless steel tubesheet combination article.

DETAILED DESCRIPTION OF THE PREFERRED EMBODIMENTS

The present invention provides a method of welding ferritic and austenitic stainless steels by controlling the stabilizer content of the weld, thereby providing an intergranular corrosion-resistant weld. Generally, the ferritic alloys suitable for the method of the present invention may contain 17 to 35% chromium which contributes to the corrosion resistance of the alloy. Such alloys may include Type 439 (S43035), E-Brite alloys (nominally 26% chromium), with or without 1% molybdenum, and a relatively new series of ferritic alloys containing nominally 29% chromium, 4% molybdenum and optionally 2% nickel. The ferritic stainless steel alloys may be stabilized, such as the Type 439, or may contain low interstitials, i.e., carbon and nitrogen levels totaling less than 0.025% with or without any stabilizing elements. They must be capable of demonstrating intergranular corrosion resistance when autogenously joined to themselves. For that reason the alloy composition must be capable of intergranular corrosion resistance when thermally cycled as in welding in accordance with an object of the invention to prevent sensitivity to intergranular corrosion resulting from mix of materials in the weld pool rather than provide for the stabilization of the base metal composition.

Generally, the austenitic stainless steels suitable for the method of the present invention may contain 16 to 29% chromium. The austenitic stainless steel may be stabilized and provide the stabilizing element source for the welded article. Such alloys include Types 304, 310 and 317 alloys and stabilized Types 321 and 347. The present invention is equally suitable for welding to nickel base alloys such as Alloy G, 825 and 625.

In conventionally-melted and stabilized ferritic stainless steels, the weld deposit must contain enough stabilizer to meet the stabilization formula specified for that ferritic stainless steel at the carbon and nitrogen total levels at the weld deposit. For this invention, the stabilizer may be provided from a stabilized ferritic stainless steel, or from a stabilized austenitic stainless steel or from a stabilized filler metal or any combination thereof. Generally, if the austenitic steel is well stabilized, then no stabilizer filler metal may be required for weld stabilization. Similarly, if the ferritic steel is well stabilized, no stabilization of the austenitic steel or filler metal may be required. A well-stabilized steel means a steel having far in excess of stoichiometric amounts of stabilizer. Preferably, the primary source of stabilizer is obtained from a stabilized weld filler metal. Regardless of the source or sources of stabilizer for ferritic stainless-austenitic stainless welded articles, sufficient stabilizer must be provided to the molten metal mix occasioned by the weld heat to stabilize the deposit.

The stabilizing elements may be selected from the group consisting of titanium and columbium. Generally, if columbium is the primary stabilizer at levels above 0.5%, small amounts of titanium are desirable to minimize weld cracking. Titanium, however, may be used as the primary stabilizer without columbium.

It has been found that the stabilizer in the weld deposit should be controlled to contain up to about 4% stabilizer and preferably up to about 3.6%. If the weld deposit contains at least about 22% chromium or at least about 30% total of chromium and three times the molybdenum content, then the minimum stabilizer should be at least 0.5%. If the weld deposit contains less than about 22% chromium or less than about 30% total chromium and three times the molybdenum content, then a greater minimum stabilizer is required of at least 0.8%.

Preferably, a stabilized weld filler metal is used. By providing a stabilized filler metal, the resulting weld will be resistant to intergranular corrosion regardless of any variations of the stabilizer level from heat-to-heat of the ferritic alloy.

For welding low interstitial ferritic alloys to austenitic stainless steels or austenitic nickel base alloys, it has been found necessary that:
1. A filler with 0.8% minimum stabilizer be required when either the filler metal chromium is less than 22% or the filler metal chromium plus three times the filler metal molybdenum is less than 30%.
2. A filler metal with 0.5% minimum stabilizer is required when the filler metal contains 22% or more chromium or the filler metal chromium plus three times the filler metal molybdenum equals or exceeds 30%.

For low interstitial stainless steels, such requirements are preferable whether or not small amounts of stabilizing additives are included in the ferritic alloy.

The present invention appears suitable for any of various welding techniques, and particularly, is applicable to gas-tungsten-arc welding and shielded metal arc welding.

In order to more completely understand the present invention, samples of various alloys which were welded and subjected to standard intergranular corrosion tests are presented in the Examples.

EXAMPLE I

For the weld data shown in Table I, a manual gas-tungsten-arc welding (GTAW) procedure was used. The conditions included an AC/DC 300 amp. high frequency transformer/rectifier power source; straight polarity (electrode negative); 100% argon shielding gas on face and root sides. Some welds were made with weld filler metal which was manually laid under the arc, as indicated. Sample coupons were prepared and subjected to standard intergranular corrosion tests:

ASTM A262 Practice A (Also listed as ASTM A763 Practice W)—Oxalic Acid Etch Test in which samples are rough polished and etched electrolytically in a 10% oxalic acid solution at 6.5 amps. per square inch (1 A/cm$^2$) for 90 seconds. The samples are subjectively rated for degree of attack against standard photomicrographs published in the procedure. Observation of grain boundary widening which entirely surrounds grains (ditching) indicates failure. Observation of light grain boundary etching (step) passes.

ASTM A262 Practice E (Also listed as ASTM A763 Practice Z)—Copper-Copper Sulfate-16% Sulfuric Acid Test in which samples are exposed for 24 hours and then bent. Observation of intergranular openings (fissures) in bending indicates failure.

TABLE I

INTERGRANULAR CORROSION TESTS ON 18 Cr—0 Mo—Ti STABILIZED FERRITIC STAINLESS STEEL TYPE 439 (S43035) REQUIRING Ti MINIMUM .20 + 4 (C + N) FOR STABILIZATION

| Type 439 Heat Used | | | |
|---|---|---|---|
| C | N | Ti | Ti Required |
| .018 | .015 | .34 | .34 |

| Combination | C | N | Ti | ASTM A262 Practice A | ASTM A262 Practice E |
|---|---|---|---|---|---|
| Type 439 welded to 439 No Filler | .018 | .015 | .34 | Step (Pass) | Pass |
| Type 439 welded to 304L No Filler | .018 .025 | .015 .060 | .34 — | Weld Ditching (Fail) | Weld Fissures (Fail) |
| Type 439 welded to 304 308L Filler | .018 .068 .03 | .015 .065 .03 | .34 — — | Weld Ditching (Fail) | Weld Fissures 439 side of weld |
| Type 439 welded to 304 | .018 .068 | .015 .065 | .34 — | Step (Pass) | Pass |
| Inconel 82 ® Filler | .02 | .02 | 0.6 Ti + 2.5 Nb | | |

® Registered trademark of International Nickel Company
NOTE: Carbon and nitrogen values in Table refer to analysis of each material listed in the combination.

Table I demonstrates that the lot of ferritic stainless steel used was capable of passing the tests utilized when welded to a matching material even though the material was at the leanest composition judged suitable by composition. When joined to Type 304L with no filler, the weld is sufficiently enriched in carbon and nitrogen to suffer attack in tests. Even unstabilized low carbon filler (Type 308L) produces susceptibility (although only on the 439 side in Practice E). Only a well-stabilized filler maintains the resistance of 439 to austenitic alloy welds.

EXAMPLE II

For the weld data in Table II, the welds were also prepared by a manual GTAW procedure as in Example I, except that when all ferritic combinations were produced somewhat greater argon backing gas flow was used through a ported chill bar as a precaution that no air would reach the molten low interstitial pool and thereby increase the nitrogen level in the weld. Sample coupons were prepared and subjected to intergranular corrosion tests ASTM A262 Practices A and E as in Example I. Also, the samples were subjected to intergranular corrosion tests:

ASTM A262 Practice B (Also listed as ASTM A763 Practice X)—Ferric Sulfate-50% Sulfuric Acid in which samples are tested for 120 hours to determine weight loss and calculated penetration rates. Typically, rates of 0.6 mm/a (24 mils per year) may be a specified maximum for evaluation of E-Brite base metal. Since this is a highly oxidizing test, various base and filler materials may resist the solution to differing degrees. Consequently, rate information is of secondary importance to the to the observation of localized attack. Localized attack indicates sensitivity to intergranular corrosion.

ASTM A262 Practice C—Boiling 65% Nitric Acid in which samples are exposed for 240 hours to determine weight loss and a calculated penetration rate. Localized attack indicates sensitivity to intergranular corrosion.

TABLE II

INTERGRANULAR CORROSION TESTS ON LOW INTERSTITIAL FERRITIC STAINLESS STEELS WELDED WITH AUSTENITIC MATERIALS WITH LESS THAN 22% Cr OR IN WHICH Cr + 3 Mo IS LESS THAN 30

| Filler | Cr | Cr + 3 Mo | Stabilizer | Corrosion Rates - mm/a (mils/yr) When Test Requires Calculation and Location of Preferential Attack | | | |
|---|---|---|---|---|---|---|---|
| | | | | A262 Practice A | A262 Practice B | A262 Practice C | A262 Practice E |
| 26 Cr-1 Mo <.025 C + N FERRITIC STEEL WITH .1% Nb | | | | | | | |
| Incoweld A ® | 15 | 15 | 1.8 Nb | Step (Pass) | 0.42 (16.7) No preferential attack | 0.23 (9.1) No preferential attack | Pass |
| 316L | 17 | 24 | — | Ditching in weld (Fail) | 0.57 (22.4) Weld attack | 0.32 (12.7) Weld attack | Weld fissuring (Fail) |
| 308L | 20.5 | 20.5 | — | Ditching in first E-Brite grain | 0.61 (24.1) Weld attack | 0.31 (12.1) Weld attack | Weld fissuring (Fail) |

TABLE II-continued

INTERGRANULAR CORROSION TESTS ON LOW INTERSTITIAL FERRITIC STAINLESS STEELS
WELDED WITH AUSTENITIC MATERIALS WITH LESS THAN 22% Cr OR IN WHICH Cr + 3 Mo IS
LESS THAN 30

| Filler | Cr | Cr + 3 Mo | Stabilizer | A262 Practice A | A262 Practice B | A262 Practice C | A262 Practice E |
|---|---|---|---|---|---|---|---|
| | | | | adjacent weld (Fail) | | | |
| 309L Mo | 23 | 29.5 | — | Ditching in weld and first E-Brite grains adjacent weld (Fail) | 0.53 (20.7) Weld attack | 0.44 (17.0) Weld attack | Weld & E-Brite heat affected zone fissuring (Fail) |
| 347 | 20 | 20 | .8 Nb | 1 Step 1 Ditch (Marginal) | 0.48 (18.9) Weld attack | 0.22 (8.7) Weld attack | Pass |
| Inconel 82 ® | 20 | 20 | .6 Ti + 2.5 Nb | Step (Pass) | 0.83 (32.6) No preferential attack | 0.21 (8.1) No preferential attack | Pass |
| Comparison All 26 Cr-1 Mo (Ferritic) | 26 | 29 | .1 Nb | Step (Pass) | 0.30 (12.0) No preferential attack | 0.11 (4.4) No preferential attack | Pass |
| 29 Cr-4 Mo-2 Ni <.025 C + N UNSTABILIZED | | | | | | | |
| 308L | 20.5 | 20.5 | — | Not applicable to 29 Cr-4 Mo-2 Ni | 3.19 (126) Weld attack | .83 (32.7) Weld attack | Weld ditching (Fail) |
| Comparison All 29 Cr-4 Mo-2 Ni (Ferritic) | 29 | 41 | — | Not applicable to 29 Cr-4 Mo-2 Ni | .18 (6.95) No preferential attack | .07 (2.8) No preferential attack | Pass |

Specific rates are given for 304L as the material joined to the ferritic using the specified filler (exception - comparison all ferritic results). Although rates shown vary for other austenitic materials substituted for 304L, the ETCH structures, locations of preferential attack and Practice E performance are similar for a given filler material.
® Registered trademark of International Nickel Company Table II demonstrates that unstabilized austenitic fillers uniformly show objectionable results, namely weld ditching, weld attack and weld fissuring. At a level of 0.8% Nb, some pass and some weld attack results are observed. At highest stabilizer levels, uniformly pass results are observed, as with all ferritic combinations. Type 308L shows uniformly objectionable results, while Type 347 at the same Cr and Cr+3(Mo) levels shows some attack but is generally satisfactory and Inconel 82 at the same Cr and Cr+3(Mo) level is uniformly satisfactory. Type 316L at a higher Cr+3(Mo) level is uniformly unsatisfactory.

EXAMPLE III

For the weld data in Table III, the welds were prepared in accordance with Example II.

TABLE III

INTERGRANULAR CORROSION TESTS ON LOW INTERSTITIAL FERRITIC STAINLESS
STEELS WELDED WITH AUSTENITIC MATERIALS WITH A MINIMUM 22% Cr OR IN
WHICH Cr + 3 Mo IS A MINIMUM OF 30

| Filler | Cr | Cr + 3 Mo | Stabilizer | A262 Practice A | A262 Practice B | A262 Practice C | A262 Practice E |
|---|---|---|---|---|---|---|---|
| 26 Cr-1 Mo <.025 C + N FERRITIC STEEL WITH .1% Nb | | | | | | | |
| 309L Mo | 23 | 29.5 | — | Ditching in weld and first E-Brite grains adjacent weld (Fail) | 0.53 (20.7) Weld attack | 0.44 (17.0) Weld attack | Weld & E-Brite heat affected zone fissuring |
| Incoloy 135 ® | 29 | 40.5 | .5 Ti | Pass | 0.46 (18.2) No preferential attack | 0.22 (8.7) No preferential attack | Pass |
| Comparison All 26 Cr-1 Mo (Ferritic) | 26 | 29 | .1 Nb | Step (Pass) | 0.30 (12.0) No preferential attack | 0.11 (4.4) No preferential attack | Pass |
| 29 Cr-4 Mo-2 Ni <.025 C + N UNSTABILIZED | | | | | | | |
| Alloy C-276 | 15.5 | 63.5 | — | Not applicable to 29 Cr-4 Mo-2 Ni | 6.2 (240) Weld attack | 1.85 (73) Weld attack | Indeterminate |
| Incoloy 135 ® | 29 | 41.5 | .5 Ti | Not applicable to 29 Cr-4 Mo-2 Ni | .35 (13.7) No preferential attack | .28 (10.9) No preferential attack | Pass |
| Alloy 625 | 21.5 | 48.5 | 3.6 Nb | Not applicable | .55 | .52 | Pass |

TABLE III-continued
INTERGRANULAR CORROSION TESTS ON LOW INTERSTITIAL FERRITIC STAINLESS STEELS WELDED WITH AUSTENITIC MATERIALS WITH A MINIMUM 22% Cr OR IN WHICH Cr + 3 Mo IS A MINIMUM OF 30

| Filler | Cr | Cr + 3 Mo | Stabilizer | A262 Practice A | A262 Practice B | A262 Practice C | A262 Practice E |
|---|---|---|---|---|---|---|---|
| | | | | to 29 Cr-4 Mo-2 Ni | (21.5) Weld grains outlined | (20.6) None | |
| Comparison All 29 Cr-4 Mo-2 Ni (Ferritic) | 29 | 41 | — | Not applicable to 29 Cr-4 Mo-2 Ni | .18 (6.95) No preferential attack | .07 (2.8) No preferential attack | Pass |

Specific rates are given for 304L (to 26 Cr-1 Mo) and Alloy 625 (to 29 Cr-4 Mo-2 Ni) as the material joined to the ferritic using the specified filler (exception - comparison all ferritic results). Although rates shown vary for other austenitic materials substituted for 304L or 625, the ETCH structures, locations of preferential attack and Practice E performance are similar for a given filler material.
® Registered trademark of International Nickel Company Table III demonstrates that unstabilized austenitic fillers uniformly show objectionable results, namely weld ditching, weld attack and fissuring, even for a highly alloyed material like Alloy C-276. At a level of 0.5% Ti and above, uniformly pass results are observed at Cr+3(Mo) contents substantially less than Alloy C-276, as with all ferritic combinations.

Although preferred and alternative embodiments have been described, it will be apparent to those skilled in the art that changes can be made therein without departing from the scope of the invention.

What is claimed is:

1. In a method of welding ferritic stainless steel to austenitic metal alloy to form a welded article, the ferritic steel having 17 to 35% chromium and the austenitic steel having about 16 to 29% chromium, the ferritic steel containing a total carbon and nitrogen content less than the total carbon and nitrogen content of the austenitic steel, and the weld deposit containing titanium and columbium as stabilizing elements, the improvement comprising:
   providing the weld deposit with at least 0.5% up to about 4.0% of stabilizer selected from the group consisting of titanium and columbium, and
   providing at least 0.8% stabilizer when the weld deposit contains less than about 22% chormium or less than about 30% total of chromium and three times the molybdenum content;
   said stabilizer being sufficient to stabilize the carbon and nitrogen of the weld deposit to provide a corrosion-resistant welded article.

2. The method as set forth in claim 1 including selecting a stabilized ferritic steel as the source of stabilizer for the weld deposit.

3. The method as set forth in claim 1 including selecting a stabilized austenitic steel as the source of stabilizer for the weld deposit.

4. The method as set forth in claim 1 including selecting a low interstitial ferritic stainless steel base metal containing less than 0.025% total carbon and nitrogen.

5. The method as set forth in claims 1 or 2 or 4 including selecting a weld filler metal containing stabilizer of a sufficient amount to stabilize the weld deposit.

6. The method as set forth in claim 1 wherein welding is gas-tungsten-arc welding.

7. The method as set forth in claim 1 wherein welding is shielded metal arc welding.

8. In a method of welding ferritic stainless steel to austenitic stainless steel to form a welded article, the ferritic steel having about 17 to 35% chromium and the austenitic steel having about 16 to 29% chromium, the ferritic steel containing a total carbon and nitrogen content less than the total carbon and nitrogen content of the austenitic steel, and a weld filler metal containing titanium and columbium as stabilizing elements, the improvement comprising:
   selecting the filler metal with at least 0.5% up to about 4% of stabilizer selected from the group consisting of titanium and columbium;
   said filler metal containing at least 0.8% stabilizer when the filler metal contains less than about 22% chromium or less than about 30% total of chromium and three times the molybdenum content;
   said stabilizer being sufficient to stabilize the carbon and nitrogen of the weld deposit to provide a corrosion-resistant welded article.

9. The method as set forth in claim 8 including selecting a low interstitial ferritic steel base metal containing less than 0.025% total carbon and nitrogen.

10. The method as set forth in claim 8 including selecting a stabilized ferritic steel and an austenitic steel which is not stabilized.

11. A corrosion-resistant welded article made in accordance with the method of claim 1.

12. A corrosion-resistant welded article made in accordance with the method of claim 8.

13. The welded article as set forth in claims 11 or wherein the ferritic steel is stabilized.

14. The welded article as set forth in claims 11 or 12 wherein the ferritic steel base metal has low interstitials of less than 0.025% total carbon and nitrogen.

15. The welded article as set forth in claim 11 wherein the weld deposit contains a weld filler metal having a sufficient amount of stabilizer to stabilize the weld deposit.

16. A corrosion-resistant welded article made in accordance with method claim 11 or 12 comprising a ferritic stainless steel tube and an austenitic stainless steel tubesheet.

17. A welded article as set forth in claim 16 wherein the welds are seal welds.

18. A welded article as set forth in claim 16 wherein the welds are strength welds.

* * * * *

UNITED STATES PATENT OFFICE
CERTIFICATE OF CORRECTION

Patent No. 4,525,620          Dated June 25, 1985

Inventor(s) H.E. Deverell and J.M. Beigay

It is certified that error appears in the above-identified patent and that said Letters Patent are hereby corrected as shown below:

In the patent, in column 10, claim 13, line 2, before "wherein", insert -- 12 --.

Signed and Sealed this

Twenty-second Day of October 1985

[SEAL]

Attest:

DONALD J. QUIGG

Attesting Officer

Commissioner of Patents and Trademarks—Designate